United States Patent
Miyagawa et al.

(10) Patent No.: US 8,076,381 B2
(45) Date of Patent: Dec. 13, 2011

(54) POLYHYDROXYALKANOATE-BASED RESIN FOAMED PARTICLE, MOLDED ARTICLE COMPRISING THE SAME AND PROCESS FOR PRODUCING THE SAME

(75) Inventors: Toshio Miyagawa, Settsu (JP); Fuminobu Hirose, Settsu (JP); Kenichi Senda, Settsu (JP)

(73) Assignees: Kaneka Corporation, Osaka (JP); Meredian, Inc., Bainbridge, GA (US)

( * ) Notice: Subject to any disclaimer, the term of this patent is extended or adjusted under 35 U.S.C. 154(b) by 0 days.

(21) Appl. No.: 11/911,552

(22) PCT Filed: Apr. 10, 2006

(86) PCT No.: PCT/JP2006/307549
§ 371 (c)(1),
(2), (4) Date: Feb. 20, 2009

(87) PCT Pub. No.: WO2006/112287
PCT Pub. Date: Oct. 26, 2006

(65) Prior Publication Data
US 2009/0149560 A1   Jun. 11, 2009

(30) Foreign Application Priority Data
Apr. 14, 2005   (JP) ................... 2005-116975

(51) Int. Cl.
*C08J 9/16* (2006.01)
*C08J 9/232* (2006.01)
*C08G 18/00* (2006.01)

(52) U.S. Cl. .............. 521/59; 521/56; 528/44; 264/54

(58) Field of Classification Search .............. 521/56, 521/59; 528/44; 264/54
See application file for complete search history.

(56) References Cited

U.S. PATENT DOCUMENTS

| | | | | |
|---|---|---|---|---|
| 4,551,483 A | * | 11/1985 | Hicks | 521/103 |
| 5,004,760 A | * | 4/1991 | Patton et al. | 424/78.27 |
| 5,082,870 A | * | 1/1992 | Fukuda et al. | 521/159 |
| 5,310,872 A | | 5/1994 | Takahashi et al. | |
| 5,373,043 A | * | 12/1994 | Harris et al. | 524/377 |
| 6,037,384 A | | 3/2000 | Kakizawa et al. | |
| 6,110,578 A | | 8/2000 | Kakizawa et al. | |
| 6,284,838 B1 | | 9/2001 | Silbiger | |
| 6,699,963 B2 | * | 3/2004 | Noda et al. | 528/481 |
| 2002/0035231 A1 | * | 3/2002 | Whitehouse et al. | 528/44 |

FOREIGN PATENT DOCUMENTS

| | | | |
|---|---|---|---|
| JP | 06-248106 A | | 9/1994 |
| JP | 09-263651 | * | 10/1997 |
| JP | 09-263651 A | | 10/1997 |
| JP | 10-324766 A | | 12/1998 |
| JP | 2000-017039 A | | 1/2000 |
| JP | 2000-169546 A | | 6/2000 |
| JP | 2000-230029 A | | 8/2000 |
| JP | 2000-319438 A | | 11/2000 |
| JP | 2001-098044 A | | 4/2001 |
| JP | 2001-106821 A | | 4/2001 |
| JP | 2002-302567 A | | 10/2002 |
| JP | 2002-327037 A | | 11/2002 |
| JP | 2003-092926 | * | 4/2003 |
| JP | 2003-092926 A | | 4/2003 |
| JP | 2003-238789 | * | 8/2003 |
| JP | 2003-238789 A | | 8/2003 |
| JP | 2003-253107 A | | 9/2003 |
| JP | 2003-327737 A | | 11/2003 |
| JP | 2004-010798 A | | 1/2004 |
| JP | 2004-107430 A | | 4/2004 |
| JP | 2004-107505 A | | 4/2004 |
| JP | 2004-143269 A | | 5/2004 |
| JP | 2004-149649 A | | 5/2004 |
| WO | 99/21915 A1 | | 5/1999 |

* cited by examiner

*Primary Examiner* — Randy Gulakowski
*Assistant Examiner* — Kara Negrelli
(74) *Attorney, Agent, or Firm* — Sughrue Mion, PLLC

(57) ABSTRACT

The object is to provide a molded product of foamed particles obtained by charging biodegradable resin foamed particles which are of vegetable origin and excellent in environmental compatibility into a mold, followed by heat molding, which molded product is not accompanied by post shrinkage after the molding with a wide range of variation of processing in the molding. Further, P3HA resin foamed particles being composed of a resin composition that comprises an isocyanate compound, and a polymer, poly(3-hydroxyalkanoate), having a recurring unit represented by the general formula (1):

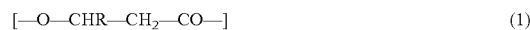

(wherein R represents an alkyl group represented by $C_nH_{2n+1}$, wherein n is an integer of from 1 to 15) produced by a microorganism are provided.

4 Claims, No Drawings

POLYHYDROXYALKANOATE-BASED RESIN FOAMED PARTICLE, MOLDED ARTICLE COMPRISING THE SAME AND PROCESS FOR PRODUCING THE SAME

CROSS REFERENCE TO RELATED APPLICATIONS

This application is a National Stage of International Application No. PCT/JP2006/307549 filed on Apr. 4, 2006, claiming priority based on Japanese Patent Application No. 2005-116975, filed Apr. 14, 2005, the contents of all of which are incorporated herein by reference in their entirety.

TECHNICAL FIELD

The present invention relates to foamed particles of a polyhydroxyalkanoate resin of vegetable origin which exhibit biodegradability, and a molded product thereof and a method of producing the resin foamed particles.

BACKGROUND ART

Under current circumstances in which environmental issues caused by waste plastics have been focused recently, biodegradable plastics which are degraded after use into water and carbon dioxide by the action of a microorganism have drawn attention.

Conventionally, various investigations have been conducted on biodegradable foamed particles and molded products thereof. For example, foamed particles obtained by crosslinking using organic peroxide or the like in order to improve foamability of the foamed products produced using a biodegradable aliphatic polyester resin obtained by synthesis with a raw material derived from petroleum, and a molded product thereof (for example, see Japanese Unexamined Patent Application Publication No. Hei 10-324766, No. 2001-106821 and No. 2004-10798); aliphatic polyester foamable particles characterized by having a certain melt viscosity through increasing the molecular weight using diisocyanate as a linking agent (for example, see Japanese Unexamined Patent Application Publication No. Hei 6-248106); and polylactic acid foamed particles produced by using a polyisocyanate, a polyhydric alcohol, a polycarboxylic acid or the like as a crosslinking agent, and a molded product thereof (for example, see pamphlet of International Publication No. 99/21915, Japanese Unexamined Patent Application Publication No. 2000-169546, Japanese Unexamined Patent Application Publication No. 2000-17039, No. 2000-230029, No. 2001-98044, No. 2002-327037, No. 2003-253107, No. 2004-107430, No. 2004-107505 and No. 2004-149649) are included.

However, any of the aforementioned biodegradable aliphatic polyester resins is obtained by synthesis with a raw material derived from petroleum, and is inferior in hydrolysis resistance. Therefore, the foamed and molded product thereof also involves problems of the physical properties after production, i.e., brittleness and the like gained due to lowering of the molecular weight. Furthermore, there are restrictions on degradation conditions in disposal because it is not anaerobically degraded. In order to solve these problems, improvement of crystallinity was intended in the aforementioned Patent Documents by increasing the molecular weight or by crosslinking in attempts to obtain a foam.

Meanwhile, a polyhydroxyalkanoate (hereinafter, referred to as P3HA) resin produced from a microorganism is disclosed in Japanese Unexamined Patent Application Publication No. 2000-319438 in connection with P3HA resin foamed particles, and a molded product thereof. In Japanese Unexamined Patent Application Publication No. 2000-319438, there is described a method of obtaining foamed particles having two melting points using poly(3-hydroxybutyrate-co-3-hydroxyhexanoate) (hereinafter, abbreviated as PHBH), which is a kind of P3HA, in a pressure tight container through using water as a dispersion medium, and isobutane as a foaming agent.

However, substantially, only foamed particles consisting of poly(3-hydroxybutyrate-co-3-hydroxyhexanoate) alone were studied.

DISCLOSURE OF THE INVENTION

Accordingly, an object of the present invention is to provide a molded product of foamed particles obtained by charging biodegradable resin foamed particles which are of vegetable origin and excellent in environmental compatibility into a mold, followed by heat molding, which molded product is obtained without post shrinkage after the molding, and with a wide range of variation of processing in the molding.

In general, when a crystalline resin such as P3HA is subjected to increase in molecular weight, crosslinking and the like using an isocyanate compound, the crystallization is reportedly liable to fail. Since P3HA is also a crystalline resin although its crystallizing velocity is slow, favorable results for improvement of the foamability had not been expected. However, the present inventors elaborately investigated in order to solve the problems as described above, and consequently found that when P3HA resin foamed particles produced from a resin composition obtained by mixing an isocyanate compound with P3HA are used, a molded product with a wide range of variation of processing in the molding is obtained without post shrinkage found after the molding. Thus, the present invention was accomplished.

Accordingly, the first aspect of the present invention relates to P3HA resin foamed particles being composed of a resin composition that comprises an isocyanate compound, and a polymer, poly P3HA, having a recurring unit represented by the general formula (1):

$$[-\text{O}-\text{CHR}-\text{CH}_2-\text{CO}-] \quad (1)$$

(wherein R represents an alkyl group represented by $C_nH_{2n+1}$, wherein n is an integer of from 1 to 15) produced by a microorganism.

In a preferred embodiment, in the above P3HA resin foamed particles, (1) P3HA is PHBH; and
(2) 1 to 20% by mole of poly(3-hydroxyhexanoate) is included in the composition of copolymerizing components of PHBH.

The second aspect of the present invention relates to a molded product of P3HA resin foamed particles obtained by charging the aforementioned resin foamed particles into a mold, followed by heat molding.

The third aspect of the present invention relates to a method of producing said P3HA resin foamed particles comprising: allowing a substrate resin including a resin composition comprising P3HA and an isocyanate compound to be dispersed in an aqueous dispersion medium in an airtight container together with a dispersant; then introducing a foaming agent into the airtight container; heating them to not lower than the softening temperature of the substrate resin; and thereafter opening one end of the airtight container so as to release the substrate resin and the aqueous dispersion medium to an atmosphere with a pressure lower than the pressure in the airtight container, thereby allowing the substrate resin to be foamed.

BEST MODE FOR CARRYING OUT THE INVENTION

Hereinafter, the present invention will be explained in more detail.

The P3HA resin foamed particles of the present invention are composed of a resin composition that comprises an isocyanate compound, and a polymer, P3HA, having a recurring unit represented by the general formula (1):

$$[\text{—O—CHR—CH}_2\text{—CO—}] \quad (1)$$

(wherein R represents an alkyl group represented by $C_nH_{2n+1}$, wherein n is an integer of 1 to 15) produced by a microorganism.

P3HA of the present invention refers to a polymer having one or more kinds of the recurring unit represented by the general formula (1):

$$[\text{—O—CHR—CH}_2\text{—CO—}] \quad (1)$$

(wherein R represents an alkyl group represented by $C_nH_{2n+1}$, wherein n is an integer of 1 to 15), i.e., 3-hydroxyalkanoate unit.

As P3HA according to the present invention, a homopolymer of 3-hydroxyalkanoate; a copolymer constituted with a combination of two or more kinds of 3-hydroxyalkanoate in which n represents different integers, i.e., a di-copolymer, a tri-copolymer, a tetra-copolymer or the like; or a blend including two or more of these may be exemplified. Among them, the homopolymer such as 3-hydroxybutyrate in which n is 1, 3-hydroxyvalylate in which n is 2, 3-hydroxyhexanoate in which n is 3, 3-hydroxyoctanoate in which n is 5, or 3-hydroxyoctadecanoate in which n is 15, or the copolymer including a combination of two or more of the aforementioned 3-hydroxyalkanoate units in which each n represents an integer different from one another, or a blend of the same can be preferably used. Furthermore, in light of a comparatively broad temperature range which can be employed in the thermal processing, PHBH that is a copolymer of 3-hydroxybutyrate in which n is 1, and 3-hydroxyhexanoate in which n is 3 is more preferred. In the composition of the copolymerizing components of PHBH, the content of 3-hydroxyhexanoate is preferably 1 to 20% by mole, more preferably 2 to 18% by mole, and still more preferably 2 to 15% by mole. When the 3-hydroxyhexanoate is included in the above range, lowering of the molecular weight due to thermal degradation in the thermal processing is likely to be suppressed because thermal processing at a high temperature is not required.

As the P3HA of the present invention, one produced by a microorganism can be used. For example, PHBH that is one of P3HA can be obtained using as a microorganism *Alcaligenes eutrophus* AC32 produced by introducing a PHA synthetic enzyme gene, which is derived from *Aeromonas caviae*, into *Alcaligenes eutrophus*, according to the method disclosed in J. Bacteriol., 179, 4821 (1997) or the like through adjusting the raw material and culture conditions appropriately.

The isocyanate compound used in the present invention is not particularly limited, and in light of the reactivity, it has preferably two or more isocyanate groups per molecule, and more preferably three or more isocyanate groups per molecule. It may be isocyanate of aromatic, alicyclic, aliphatic or the like. More specifically, the aromatic isocyanate may be an isocyanate compound having a skeleton of tolylene, diphenylmethane, naphthylene, tolidine, xylene or triphenylmethane; the alicyclic isocyanate may be an isocyanate compound having a skeleton of isophorone or hydrogenated diphenylmethane; and the aliphatic isocyanate may be an isocyanate compound having a skeleton of hexamethylene or lysine, etc. In addition, two or more of these isocyanate compounds may be also used in combination, and in light of versatility, handleability, weather resistance and the like, tolylene and diphenylmethane are preferred. Moreover, polyisocyanate of diphenylmethane is preferably used.

The amount of used isocyanate compound is preferably equal to or greater than 0.1 parts by weight per 100 parts by weight of P3HA. Although the upper limit is not particularly limited, it is preferably equal to or less than 20 parts by weight. Furthermore, in light of the quality, and also of practical applications, the amount is more preferably 0.3 to 15 parts by weight, and particularly preferably 0.5 to 5 parts by weight. When the amount of the isocyanate compound is less than 0.1 parts by weight, the film strength of the resin cannot endure the expansion force in foaming to lead breakage of the foamed cell, whereby favorable foam is not likely to be obtained. When the amount exceeds 20 parts by weight, unreacted cyanate compound may remain, or otherwise, the reaction such as crosslinking progresses so much that the foamability may be rather liable to be deteriorated.

To the P3HA resin composition in the present invention may be added various additives in the range not to impair required performances of the resulting foamed particles. Exemplary additives may include e.g., antioxidants, ultraviolet absorbers, colorants such as dyes and pigments, plasticizers, lubricants, crystallization nucleating agents, inorganic fillers, and the like. These can be used depending on the intended use, and among all, additives which exhibit biodegradability are preferred. Examples of the additive include inorganic compounds such as silica, talc, calcium silicate, wollastonite, kaolin, clay, mica, zinc oxide, titanium oxide and silicon dioxide, fatty acid metal salts such as sodium stearate, magnesium stearate, calcium stearate and barium stearate, liquid paraffin, olefin-based wax, stearylamide-based compounds and the like, but not limited thereto. Moreover, when regulation of the cell diameter of the foamed particles is needed, a cell regulator is added. As the cell regulator, inorganic agents such as talc, silica, calcium silicate, calcium carbonate, aluminum oxide, titanium oxide, diatomaceous earth, clay, sodium bicarbonate, alumina, barium sulfate, aluminum oxide, bentonite and the like may be exemplified. Generally, the amount of the used cell regulator is preferably 0.005 to 2 parts by weight.

The method of producing the P3HA resin foamed particles according to the present invention will be described below. For the P3HA resin foamed particles of the present invention, the P3HA resin particles can be used which were obtained by subjecting the P3HA resin and the isocyanate compound to heat fusion and kneading first with an extruder, a kneader, a banbury mixer, a roll or the like to produce a resin composition that serves as a substrate resin, and then molding into a particle shape which can be readily utilized in the foaming of the present invention such as a cylindrical, elliptic cylindrical, spherical, cubic, or rectangular shape. The weight of one particle is preferably not less than 0.1 mg, and more preferably not less than 0.5 mg. Although the upper limit is not particularly limited, the weight is preferably not greater than 10 mg. When the weight is less than 0.1 mg, production of the P3HA resin particle of itself is likely to be difficult.

The P3HA resin foamed particles are obtained by preferably, allowing thus resulting P3HA resin particles to be dispersed in an aqueous dispersion medium in an airtight container together with a dispersant; then introducing a foaming agent into the airtight container; heating to not lower than the softening temperature of the P3HA resin particles; then keeping at around the foaming temperature if necessary for a predetermined time; and thereafter opening one end of the airtight container so as to release the substrate resin and the aqueous dispersion medium to an atmosphere with a pressure lower than the pressure in the airtight container, thereby allowing the substrate resin to be foamed.

As the aforementioned dispersant, an inorganic substance such as e.g., tribasic calcium phosphate, calcium pyrophosphate, kaolin, basic magnesium carbonate, aluminum oxide or basic zinc carbonate is preferably used in combination with an anionic surfactant such as e.g., sodium dodecylbenzenesulfonate, sodium α-olefin sulfonate, sodium n-paraffin sulfonate or the like. The amount of the used inorganic substance is preferably 0.1 to 3.0 parts by weight per 100 parts by weight of the P3HA resin, while the amount of the used anion surfactant is preferably 0.001 to 0.5 parts by weight, and more preferably 0.001 to 0.2 parts by weight per 100 parts by weight of the P3HA resin.

It is preferred that the aqueous dispersion medium be usually water in light of the economical efficiency and handleability, but not limited thereto. The amount of the used aqueous dispersion medium is preferably 100 to 1000 parts by weight per 100 parts by weight of the P3HA resin.

Examples of the foaming agent include saturated hydrocarbons having 3 to 5 carbon atoms such as propane, n-butane, isobutane, n-pentane, isopentane and neopentane, ethers such as dimethyl ether, diethyl ether and methylethyl ether, halogenated hydrocarbons such as monochloromethane, dichloromethane and dichlorodifluoroethane, inorganic gas such as carbon dioxide, nitrogen and air, water and the like. These may be used alone, or two or more thereof may be also used. Taking into consideration the environmental compatibility, the foaming agents except for halogenated hydrocarbons are preferred. The amount of addition of the foaming agent varies depending on expansion ratio of intended preliminary foamed particles, type of the foaming agent, type of the polyester-based resin, proportion of the resin particles and the dispersion medium, void volume of the container, impregnation or foaming temperature, and the like, but in general, it is preferably 2 to 10000 parts by weight, more preferably 5 to 5000 parts by weight, and still more preferably 10 to 1000 parts by weight per 100 parts by weight of the P3HA resin particles. When the amount of the foaming agent is less than 2 parts by weight, sufficient expansion ratio may not be achieved. In contrast, when the amount of the foaming agent exceeds 10000 parts by weight, an effect to meet the surplus amount cannot be achieved, which may lead to economic waste.

Further, the foaming temperature of the P3HA resin particles is not particularly limited, but is preferably 100 to 150° C.

The heating temperature of the substrate resin may be not lower than the softening temperature of the substrate resin, which is not particularly limited, but is preferably 100 to 150° C., in general.

In addition, the atmosphere with a low pressure to which the substrate resin and the aqueous dispersion medium are released is not particularly limited as long as it has a pressure lower than the pressure in the airtight container, but is preferably under the ambient pressure.

The P3HA resin foamed particles of the present invention can be used directly for applications such as packaging materials, materials for tableware, construction materials, civil engineering materials, agricultural materials, horticultural materials, automobile interior materials, materials for adsorption, carrier and filtration, and the like. If necessary, the foamed particles are subjected to compression aging by compression air thereby imparting foamability to the resin foamed particles, and charged in a mold which can be closed but not airtightly. Subsequently, water vapor is fed into the mold to effect heat molding, whereby the resin foamed and molded product of the P3HA resin particle is produced.

EXAMPLES

The present invention will be more specifically explained by way of Examples shown below, but the present invention is not anyhow limited to these Examples. In Examples, "part" is based on the weight. The materials used in the present invention are abbreviated as in the following.

PHBH: poly(3-hydroxybutyrate-co-3-hydroxyhexanoate)
HH rate: molar fraction (% by mole) of hydroxyhexanoate in PHBH (Physical Properties of Molded Product)
<Surface Property of Molded Product>
The surface of the molded product was visually observed, and evaluated according to the following standards:
A: few irregularities found among the particles on the surface, exhibiting smooth surface;
B: somewhat many irregularities found among the particles on the surface, exhibiting slight lack in smoothness of the surface;
C: many irregularities found among the particles on the surface, exhibiting lack in smoothness of the surface.

<Measurement Method of Expansion Ratio of Resin Foamed and Molded Product>

A graduated cylinder charged with ethanol at 23° C. was provided, and to the graduated cylinder were placed a PHBH resin foamed and molded product C cut into an appropriate size, and 500 or more PHBH resin foamed particles B (weight of the group of the foamed particles: W (g)) which had been left to stand under a condition with relative humidity of 50%, at 23° C. and 1 atm for 7 days so as to allow them to submerge using a wire mesh or the like. Provided that the volume of the group of the foamed particles and the molded product read from the elevated ethanol level is defined as V ($cm^3$), the expansion ratio is determined with a resin density ρ ($g/cm^3$) according to the following formula:

$$\text{expansion ratio} = V/(W/\rho).$$

<Measurement Method of Independent Cell Rate of Resin Foamed and Molded Product>

The independent cell rate was measured with Multipicnometer (manufactured by Beckmann Japan Co., Ltd.), according to ASTM D-2856.

<Heat Deformation Rate>
Each molded product sample was cut into a piece of 15 cm square×3 cm, which was treated at 60° C., with relative humidity of 80% for 24 hrs. The rate of change of the volume was determined from the measurements of the length, width and thickness before and after the treatment.

(Physical Properties of Resin Foamed Particles)
<Measurement Method of Melting Point of Resin Foamed Particle>

Differential scanning calorimetry was carried out by precisely weighing about 5 mg of the PHBH resin particles of Examples, elevating the temperature from 0° C. to 200° C. at a rate of temperature rise of 10° C./min with a differential scanning calorimeter (manufactured by Seiko Electronics Co., Ltd., SSC5200) to obtain a DSC curve. Accordingly, the peak temperature on the endothermic curve was defined as melting point Tm. When multiple melting points are present, the melting peak on the higher temperature side is defined as Tm1, and the melting peak on the lower temperature side is defined as Tm2.

<Biodegradability of PHBH Resin Foamed Particles>

Six months after burying the P3HA resin foamed particles of Examples 10 cm under the ground, change in the shape was observed to evaluate the degradability.

(Molding and Heating Range)

A: available water vapor pressure range in molding being equal to or greater than 0.1 MPa (gauge);
B: available water vapor pressure range in molding being 0.01 MPa (gauge) or greater and less than 0.1 MPa (gauge);
C: available water vapor pressure range in molding being less than 0.01 MPa (gauge)

Example 1

After blending by hand 2 parts by weight of a polyisocyanate compound (manufactured by Nippon Polyurethane Industry Co., Ltd., Millionate MR-200 (isocyanate group: 2.7 to 2.8 equivalent/mol)) and 100 parts by weight of PHBH (PHBH having an HH rate of 12% by mole) produced using as a microorganism Alcaligenes eutrophus AC32 (Accession No. FERM BP-6038 (transferred from original deposit (FERM P-15786) deposited on Aug. 12, 1996), dated Aug. 7, 1997, National Institute of Advanced Industrial Science and Technology, International Patent Organism Depositary, address: Tsukuba Central 6, Higashi, Tsukuba, Ibaraki, Japan), which had been prepared by introducing a PHA synthase gene derived from Aeromonas caviae into Alcaligenes eutrophus, through appropriately adjusting the raw material and culture conditions, the mixture was melt-kneaded in a $\phi$35 mm single screw extruder with a kneader (manufactured by Kasamatsu Kako Kenkyusho Inc., universal extruder for laboratory use) at a cylinder temperature of 145° C. The strand extruded through a small die opening of 3 mm $\phi$ attached to the extruder tip was cut by a pelletizer to produce PHBH resin particles A having a particle weight of 5 mg.

After charging 100 parts by weight of the resin particles A and 1 part by weight of tribasic calcium phosphate as the dispersant in a 4.5-L pressure tight container, 18 parts by weight of isobutane as the foaming agent was added thereto and stirred. After elevating the temperature such that the internal temperature of the container became 124° C. (to give the foaming temperature), the container was kept in a state with the internal pressure being 2.5 MPa for 1 hour. Then, the mixture was released to an atmospheric pressure to permit expansion by passing through a nozzle with a small hole provided at the bottom of the pressure tight container. Accordingly, PHBH resin foamed particles B having an expansion ratio of 18 times and an independent cell rate of 98%, and having a crystal structure with two melting points (147° C. (Tm1), 116° C. (Tm2)) on the DSC curve according to the differential scanning calorimetry method were obtained.

The PHBH resin foamed particles B were charged in a mold of 300×400×30 mm, and to the mold was fed water vapor of 0.23 to 0.35 MPa (gauge), whereby the PHBH resin foamed particles B were heated to permit fusion, and thus a PHBH resin foamed and molded product C having an expansion ratio of 25 times, an independent cell rate of 91% and favorable surface smoothness was obtained. The heat range in the molding was evaluated according to the above standards, suggesting a broad molding heat range, and a favorable molded product was obtained. No shrinkage of the PHBH resin foamed and molded product C was found after the production, and also heat deformation under high temperature and high humidity conditions was hardly observed. Additionally, this resin exhibited favorable biodegradability. The results are shown in Table 1.

Example 2

The same procedures to Example 1 were carried out except that PHBH having an HH rate of 7% by mole was used as PHBH of the PHBH resin particle A, and the temperature in the vessel during foaming was 126° C. As a result, the PHBH resin foamed particles B having an expansion ratio of 12 times and an independent cell rate of 96%, and having a crystal structure with two melting points (153° C. (Tm1), 122° C. (Tm2)) on the DSC curve according to the differential scanning calorimetry method were obtained. Further, thereto was fed water vapor of 0.17 to 0.30 MPa (gauge), whereby heating to permit fusion was conducted. Thus, the PHBH resin foamed and molded product C having an expansion ratio of 15 times, an independent cell rate of 91% and favorable surface smoothness was obtained. The heat range in the molding was evaluated according to the above standards, suggesting a broad molding heat range, and a favorable molded product was obtained. No shrinkage of the PHBH resin foamed and molded product C was found after the production, and also heat deformation under high temperature and high humidity conditions was hardly observed. Additionally, this resin exhibited favorable biodegradability. The results are shown in Table 1.

Example 3

The same procedures to Example 2 were carried out except that the temperature in the vessel during foaming was 125° C. As a result, the PHBH resin foamed particles B having an expansion ratio of 8 times and an independent cell rate of 97%, and having a crystal structure with two melting points (151° C. (Tm1), 124° C. (Tm2)) on the DSC curve according to the differential scanning calorimetry method were obtained. Further, thereto was fed water vapor of 0.17 to 0.30 MPa (gauge), whereby heating to permit fusion was conducted. Thus, the PHBH resin foamed and molded product C having an expansion ratio of 10 times, an independent cell rate of 93% and favorable surface smoothness was obtained. The heat range in the molding was evaluated according to the above standards, suggesting a broad molding heat range, and a favorable molded product was obtained. No shrinkage of the PHBH resin foamed and molded product C was found after the production, and also heat deformation under high temperature and high humidity conditions was hardly observed. Additionally, this resin exhibited favorable biodegradability. The results are shown in Table 1.

Example 4

The procedures to Example 2 were carried out except that the temperature in the vessel during foaming was 123° C., and 1 part by weight of the polyisocyanate compound was used. As a result, the PHBH resin foamed particles B having an expansion ratio of 10 times and an independent cell rate of 92%, and having a crystal structure with two melting points (149° C. (Tm1), 121° C. (Tm2)) on the DSC curve according to the differential scanning calorimetry method were obtained. Further, thereto was fed water vapor of 0.17 to 0.30 MPa (gauge), whereby heating to permit fusion was conducted. Thus, the PHBH resin foamed and molded product C having an expansion ratio of 12 times and an independent cell rate of 90% was obtained. The heat range in the molding was evaluated according to the above standards, suggesting a broad molding heat range, and a favorable molded product was obtained. No shrinkage of the PHBH resin foamed and molded product C was found after the production, and also heat deformation under high temperature and high humidity conditions was hardly observed. Additionally, this resin exhibited favorable biodegradability. The results are shown in Table 1.

Example 5

The same procedures to Example 1 were carried out except that the temperature in the vessel during foaming was 121° C., and 1 part by weight of the polyisocyanate compound was used. As a result, the PHBH resin foamed particles B having an expansion ratio of 15 times and an independent cell rate of 91%, and having a crystal structure with two melting points (144° C. (Tm1), 114° C. (Tm2)) on the DSC curve according to the differential scanning calorimetry method were obtained. Further, thereto was fed water vapor of 0.23 to 0.35 MPa (gauge), whereby heating to permit fusion was conducted. Thus, the PHBH resin foamed and molded product C having an expansion ratio of 18 times and an independent cell rate of 90% was obtained. The heat range in the molding was evaluated according to the above standards, suggesting a broad molding heat range, and a favorable molded product was obtained. No shrinkage of the PHBH resin foamed and molded product C was found after the production, and also heat deformation under high temperature and high humidity conditions was hardly observed. Additionally, this resin exhibited favorable biodegradability. The results are shown in Table 1.

Example 6

The same procedures to Example 1 were carried out except that the temperature in the vessel during foaming was 128° C., and 4 parts by weight of the polyisocyanate compound was used. As a result, the PHBH resin foamed particles B having an expansion ratio of 20 times and an independent cell rate of 98%, and having a crystal structure with two melting points (154° C. (Tm1), 121° C. (Tm2)) on the DSC curve according to the differential scanning calorimetry method were obtained. Further, thereto was fed water vapor of 0.23 to 0.35 MPa (gauge), whereby heating to permit fusion was conducted. Thus, the PHBH resin foamed and molded product C having an expansion ratio of 22 times and an independent cell rate of 94% was obtained. The heat range in the molding was evaluated according to the above standards, suggesting a broad molding heat range, and a favorable molded product was obtained. No shrinkage of the PHBH resin foamed and molded product C was found after the production, and also heat deformation under high temperature and high humidity conditions was hardly observed. Additionally, this resin exhibited favorable biodegradability. The results are shown in Table 1.

Comparative Example 1

The same procedures to Example 1 were carried out except that the polyisocyanate compound was not used in the PHBH resin particles A. As a result, the PHBH resin foamed particles B having an expansion ratio of 13 times and an independent cell rate of 53%, and having a crystal structure with two melting points (145° C. (Tm1), 113° C. (Tm2)) on the DSC curve according to the differential scanning calorimetry method were obtained. Further, thereto was fed water vapor of 0.02 MPa (gauge). However, significant shrinkage occurred on the PHBH resin foamed particles B, and thus favorable PHBH resin foamed and molded product C could not be obtained. Additionally, this resin exhibited favorable biodegradability. The results are shown in Table 1.

Comparative Example 2

The same procedures to Example 3 were carried out except that the polyisocyanate compound was not used in the PHBH resin particles A. As a result, the PHBH resin foamed particles B having an expansion ratio of 10 times and an independent cell rate of 90%, and having a crystal structure with two melting points (149° C. (Tm1), 123° C. (Tm2)) on the DSC curve according to the differential scanning calorimetry method were obtained. Further, thereto was fed water vapor of 0.15 MPa (gauge). However, significant shrinkage occurred on the molded product, and thus favorable PHBH resin foamed and molded product C could not be obtained. Additionally, this resin exhibited favorable biodegradability. The results are shown in Table 1.

Comparative Example 3

Polylactic acid having a proportion of D-form being 10%, a number average molecular weight of 100,000, a weight average molecular weight of 210,000, and the residual lactide content of 0.2% was melted and kneaded with a biaxial extruder (manufactured by Toshiba Machine Co., Ltd., TEX35B, L/D=35) together with 2 parts by weight of a polyisocyanate compound (manufactured by Nippon Polyurethane Industry Co., Ltd., Millionate MR-200 (isocyanate group: 2.7 to 2.8 equivalent/mol)). Using an underwater cutter, a beads resin composition having a particle size of about 1 mm $\phi$ was obtained. The beads resin composition was subjected to aging and secondary crosslinking in warm water at 42° C. for 15 hrs, followed by dehydration and drying. Then, blister gas impregnation was carried out.

For the impregnation in a blister gas, 4.3 kg of the aged beads were charged in a 10-L rotary drum type airtight container, to which 215 g of methanol and 1720 g of isobutane were added. Impregnation was carried out at 85° C. for 3 hrs, followed by air drying at an ordinary temperature with air flow to obtain resin particles. Thus resulting resin particles were pre-expanded with a pre-expander for polystyrene foam (manufactured by Daisen Industry Co. Ltd., DYHL-300), and then molded in a molding machine for polystyrene foam (manufactured by Daisen Industry Co. Ltd., VS-300L-MC) into a board of 30 cm square×3 cm. As a result, a molded product having an expansion ratio of 40 times, an independent cell rate of 98% and favorable surface smoothness was obtained. In addition, the determination of the heat deformation of the molded product under high temperature and high humidity conditions revealed expansion of 40% as compared with the volume before the determination.

TABLE 1

|  |  | Ex. 1 | Ex. 2 | Ex. 3 | Ex. 4 | Ex. 5 | Ex. 6 | Compar. Ex. 1 | Compar. Ex. 2 | Compar. Ex. 3 |
|---|---|---|---|---|---|---|---|---|---|---|
| HH rate | % | 12 | 7 | 7 | 7 | 12 | 12 | 12 | 7 | — |
| Temperature in the vessel (foaming temperature) | ° C. | 124 | 126 | 125 | 123 | 121 | 128 | 124 | 125 | — |

TABLE 1-continued

|  |  | Ex. 1 | Ex. 2 | Ex. 3 | Ex. 4 | Ex. 5 | Ex. 6 | Compar. Ex. 1 | Compar. Ex. 2 | Compar. Ex. 3 |
|---|---|---|---|---|---|---|---|---|---|---|
| Isobutane | part | 18 | 18 | 18 | 18 | 18 | 18 | 18 | 18 | — |
| Melting point of foamed particles | °C. | 147, 116 | 153, 122 | 151, 124 | 149, 121 | 144, 114 | 154, 121 | 145, 113 | 149, 123 | — |
| Expansion ratio of foamed particles | time | 18 | 12 | 8 | 10 | 15 | 20 | 13 | 10 | — |
| Independent cell rate of foamed particles | % | 98 | 96 | 97 | 92 | 91 | 98 | 53 | 90 | — |
| Expansion ratio of foamed and molded product | time | 25 | 15 | 10 | 12 | 18 | 22 | — | — | 40 |
| Independent cell rate of foamed and molded product | % | 91 | 91 | 93 | 90 | 90 | 94 | — | — | 98 |
| Surface nature |  | A | A | A | B | B | A | C | C | A |
| Molding heat range |  | A | A | A | A | A | A | C | C | A |
| Heat deformation rate | % | −0.9 | 0.2 | 0.1 | −0.3 | −1.1 | 0.2 | — | — | 40 |

INDUSTRIAL APPLICABILITY

A molded product of foamed particles in which a biodegradable P3HA resin is used which is of vegetable origin and excellent in environmental compatibility can be obtained without post shrinkage found after the molding, and with favorable surface property under a wide variety of molding conditions.

The invention claimed is:

1. Poly(3-hydroxyalkanoate) resin foamed particles being composed of a resin composition that comprises an isocyanate compound, and a polymer, poly(3-hydroxyalkanoate), having a recurring unit represented by the general formula (1):

[—O—CHR—CH$_2$—CO—]  (1)

wherein R represents an alkyl group represented by C$_n$H$_{2n+1}$, wherein n is an integer of from 1 to 15, produced by a microorganism,
wherein the poly(3-hydroxyalkanoate) is poly(3-hydroxybutyrate-co-3-hydroxyhexanoate) and the 3-hydroxyhexanoate is included in an amount of 1 to 20% by mole in the composition of copolymerizing components of the poly(3-hydroxybutyrate-co-3-hydroxyhexanoate) wherein the amount of the isocyanate compound is 0.5 to 4 parts by weight per 100 parts by weight of the poly(3-hydroxyalkanoate).

2. A molded product of the poly(3-hydroxyalkanoate) resin foamed particles obtained by charging the resin foamed particles according to claim 1 into a mold, followed by heat molding.

3. A method of producing the poly(3-hydroxyalkanoate) resin foamed particles according to claim 1 comprising: allowing a substrate resin comprising a resin composition comprising poly(3-hydroxyalkanoate) and an isocyanate compound to be dispersed in an aqueous dispersion medium in an airtight container together with a dispersant; then introducing a foaming agent into the airtight container; heating them to not lower than the softening temperature of the substrate resin; and thereafter opening one end of the airtight container so as to release the substrate resin and the aqueous dispersion medium to an atmosphere with a pressure lower than the pressure in the airtight container, thereby allowing the substrate resin to be foamed.

4. A process of production of a molded article, comprising charging the foamed particles according to claim 1 into a mold, followed by heat molding to obtain the molded article.

* * * * *